United States Patent [19]

Wells

[11] 3,961,162

[45] June 1, 1976

[54] METHOD AND APPARATUS FOR INTERRUPTING A DEVICE FOR A PRESELECTED INTERVAL OF TIME

[75] Inventor: William R. Wells, Linwood, N.J.

[73] Assignee: United Audio Visual Corporation, Mays Landing, N.J.

[22] Filed: Dec. 31, 1974

[21] Appl. No.: 537,750

[52] U.S. Cl. .............................. 235/61.11 E; 200/46
[51] Int. Cl.² .................... G06K 7/10; H01H 43/08
[58] Field of Search ............ 235/61.11 E, 61.11 R, 235/61.11 A, 61.11 C; 200/46; 250/555, 566, 568, 570

[56] References Cited
UNITED STATES PATENTS

| | | | |
|---|---|---|---|
| 3,049,598 | 8/1962 | Lannan | 200/46 |
| 3,056,864 | 10/1962 | Albee | 200/46 |
| 3,437,767 | 4/1969 | Montgomery | 200/46 |
| 3,482,081 | 12/1969 | Peterson | 200/46 |
| 3,511,976 | 5/1970 | Neidenberg et al. | 200/46 |

Primary Examiner—Daryl W. Cook
Attorney, Agent, or Firm—Seidel, Gonda & Goldhammer

[57] ABSTRACT

A storage medium carries information representing the period of time during which a device is to be interrupted. A first portion of the information indicates that the device is to be interrupted, and a second portion of the information indicates the time period during which the device is to remain interrupted. A first digital signal is generated in response to the first portion of the stored information, and the device is interrupted in response to the first digital signal. A second digital signal is generated in response to the first digital signal and the second portion of the stored information, and a series of clock pulses is generated in response to the second digital signal. A preselected number of the clock pulses are counted, and a third digital signal is generated to indicate the completion of the count. The device is started when the third digital signal is generated. The device is interrupted for a preselected time period determined by the pulse repetition frequency of the clock pulses.

13 Claims, 2 Drawing Figures

METHOD AND APPARATUS FOR INTERRUPTING A DEVICE FOR A PRESELECTED INTERVAL OF TIME

BACKGROUND OF THE INVENTION

The present invention relates to the automatic interruption of a device in response to information stored in a storage medium. In particular, the present invention relates to a method and apparatus for automatically interrupting a tape reader for a plurality of preselected time intervals in response to information stored in a storage medium such as a tape.

In recent years, audio-visual performances using multiple slide projectors and other audio-visual aids have become so complex that an electronic means for arranging the projection sequences has become a necessity. Such an electronic means is hereinafter referred to as the programmer.

In general, a programmer may be operated in either a manual or automatic mode. The present invention is directed to the automatic operation of the programmer. When operated automatically, the states of the programmer are determined by a memory storage facility such as a punched tape. Typically, the punched tape may be an eight channel tape which is one inch wide and composed of paper, plastic or combinations thereof. The tape contains the program which determines the sequence of operation of the slide projectors and other audio-visual devices. The tape is provided with one or more holes on each line, hereinafter referred to as a "cue", across the tape width. Each of the holes corresponds to a data channel in the programmer for operating a particular audio-visual device. The data may serve to actuate a projector, a dissolve unit, a light, a tape recorder, and so forth.

The punched tape is fed through an electro-optical tape reader which reads the information on the tape, cue by cue, and transfers the information to the programmer signal processing circuitry. The signal processing circuitry receives the tape reader outputs and generates appropriate electronic signals for controlling the audio-visual devices in accordance with the information on the tape.

Although each cue on the tape contains the necessary information for determining the state of particular audio-visual devices at a given instant of time, it may be required that a particular operating state be maintained for a preselected interval of time. For example, it is often desirable to leave the audio-visual devices in a particular state for a preselected interval of time in order to obtain dramatic effects during an audio-visual show. In addition, the limited cycling times of the audio-visual devices requires that each audio-visual device be permitted to fully cycle before being operated again by the programmer. Moreover, it may be desirable to momentarily interrupt the audio-visual show and fix the states of the audio-visual devices for a preselected interval of time in order to insure audience comprehension of the show.

Prior to the present invention, it was necessary to leave a great number of the cues on a tape blank in order to achieve the required delays. Thus, the tape reader would scan the blank cues without generating any electronic signals at the input of the programmer signal processing circuitry, and the audio-visual devices would not change their states until a cue was reached which contained punched holes. This, however, involves an appreciable waste of tape space.

Although it is known in the prior art to manually interrupt the operation of the tape reader and programmer, manual operation is cumbersome and slow, and it introduces a discontinuity in the general pace of the audio-visual performance.

A primary advantage of the present invention is to automatically interrupt the operation of a device, such as a tape reader, for a plurality of preselected intervals of time.

A further advantage of the present invention is to interrupt the operation of a device such as a tape reader during an audio-visual performance without introducing a discontinuity in the general pace of the performance.

A still further advantage of the present invention to automatically interrupt an audio-visual performance for a plurality of preselected intervals of time without wasting portions of a storage medium such as a tape.

Other advantages will appear hereinafter.

BRIEF SUMMARY OF THE INVENTION

Briefly, a first digital signal is generated in response to a first portion of information stored in a storage medium, and a device is interrupted in response to the first digital signal. A second digital signal is generated in response to the first digital signal and a second portion of information stored in the storage medium, and a series of clock pulses is generated in response to the second digital signal. A preselected number of the clock pulses is counted and, when the count is completed, a third digital signal is generated for starting the device. The device is interrupted for a preselected interval of time determined by the pulse repetition frequency of the clock pulses.

Figure 1A:
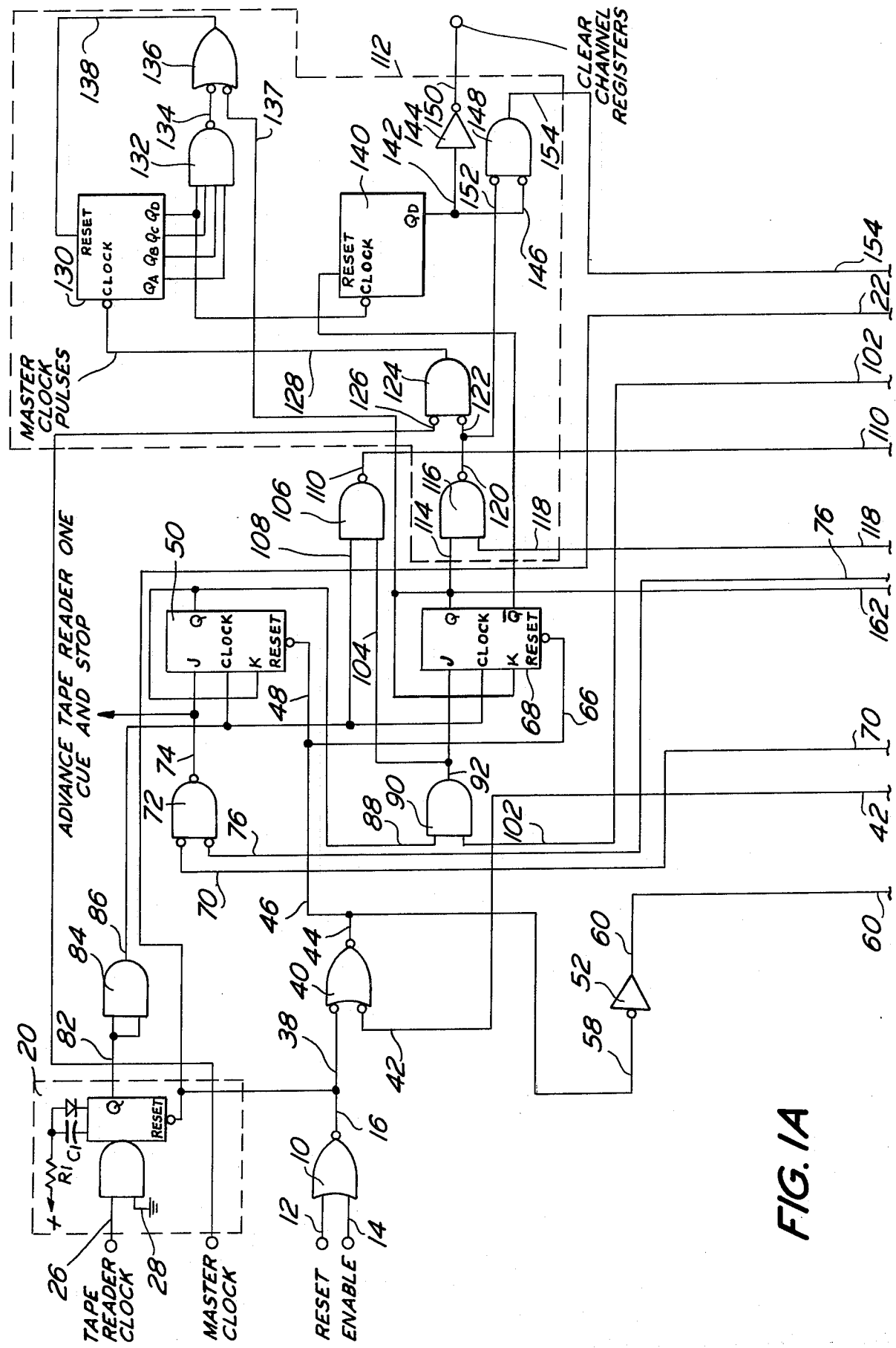
FIGS. 1A and B are a composite electrical schematic of a circuit constructed in accordance with the principles of the present invention.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Referring to the drawings, wherein like numerals indicate like elements, a NOR gate 10 is provided with reset and enable inputs 12 and 14 and an output 16. The output 16 of NOR gate 10 is connected to the reset input 18 of a retriggerable one-shot shot 20 and the reset input 22 of a retriggerable one-shot 24. Retriggerable one-shots 20 and 24 may be Texas Instruments 74123 retriggerable one-shots or any other functionally equivalent circuit known in the art for generating a delay pulse output in response to an input signal and which is resettable. In a preferred embodiment, one-shots 20 and 24 each have two trigger inputs. One trigger input 26 to one-shot 20 is connected to a tape reader clock which transfers data from a tape reader (not shown) to a bank of channel registers in a programmer (not shown) which controls the operating states of a plurality of devices in response to the tape reader outputs. A typical programmer for these purposes is described in pending U.S. application Ser. No. 486,805 entitled Programmer Expander for a Plurality of Devices, incorpoated herein by reference. It should be understood, however, that neither the tape reader, the tape reader clock, nor the programmer, per se, form part of the present invention. The second trigger input to one-shot 20, trigger input 28, is not used in the preferred embodiment and, therefore, it is permanently clamped to a "low" digital level. A trigger input 30 to one-shot 24 is connected to the Q output of a flip-flop 34, and another trigger input 36 to one-shot 24 is permanently clamped to a low digital level. The duration of the output signals generated by one-shots 20 and 24 are determined by the resistive and capacitive elements $R_1$, $C_1$ and $R_2$, $C_2$, respectively. It is understood that these resistive and capacitive elements form part of the one-shots 20 and 24, respectively. In a preferred embodiment, $R_1$ is 10K, $R_2$ is 13K, $C_1$ is 0.47$\mu$f and $C_2$ is 1$\mu$f. However, these elements may be modified to assume other values depending on the timing requirements of the particular application of the invention, as will appear more fully below.

If both reset input 12 and enable input 14 are at low digital levels, NOR gate 10 will generate a "high" digital level which disables the reset inputs 18 and 22 of one-shots 20 and 24, respectively. If, however, either reset input 12 or enable input 14 is at a high digital level, NOR gate 10 will generate a low digital level which resets one-shots 20 and 24. Reset input 12 is high when power is initially turned on, and it is low at all other times. When the programmer is operated automatically in a high speed mode, that is, when the programmer is not being manually operated, enable input 14 will be low. The particular digital level at reset and enable inputs 12 and 14 is determined by conventional switching elements in the programmer. After power has been turned on and the programmer is operating in the high speed mode, then, NOR gate output 16 will be high.

NOR gate output 16 is connected to the reset input 38 of an AND gate 40. The other input of AND gate 40, input 42, is connected to the $\overline{Q}$ output of one-shot 24. When one-shot 24 is triggered at trigger input 30, it generates a low digital pulse at its $\overline{Q}$ output, and AND gate 40 generates a low digital pulse at its output 44. In addition, if either reset input 12 or enable input 14 to NOR gate 10 goes high, NOR gate output 16 will drive reset input 38 to AND gate 40 low. As a result, AND gate output 44 will go low. AND gate output 44 is connected by line 46 to the reset inputs 48 and 66 of flip-flops 50 and 68, respectively. AND gate output 44 is also connected, through an inverter 52, to the clear inputs of counters 56 and 64, respectively. In particular, AND gate output 44 is connected to the input 58 of inverter 52, and the output 60 of inverter 52 is connected to the clear inputs of counters 56 and 64.

Therefore, when either the reset input 12 or enable input 14 of NOR gate 10 goes high or the $\overline{Q}$ output of one-shot 24 goes low, AND gate output 44 goes low and resets flip-flops 50 and 68, and inverter output 60 goes low to counters 56 and 64.

When, however, both reset input 12 and enable input 14 to NOR gate 10 are low and the $\overline{Q}$ output of one-shot 24 is high, that is, when the one-shot 24 is not triggered or has timed out, the AND gate output 44 will be high, disabling the reset inputs 48 and 66 of flip-flops 50 and 68 and the clear inputs of counters 56 and 64. The operation of flip-flops 50 and 68 and counters 56 and 64 is described in greater detail hereinafter.

Assuming that the power has initially been turned on, that reset input 12 has gone high and is now low, and that the programmer is operating automatically in a high speed mode so that enable input 14 is low, AND gate input 38 will be high. Additionally, assuming that one-shot 24 is inactive, AND gate input 42 will be high. Therefore, the reset inputs of flip-flops 50 and 68 and the clear inputs of counters 56 and 64 will be disabled. The tape reader will scan the tape at a fixed rate. The tape contains information for controlling the operation of the programmer, as described in detail in pending application Ser. No. 486,805. Specifically, information is stored in the tape in the form of lines of punched holes, hereinafter referred to as "clues". Typically, each cue comprises eight positions, hereinafter referred to as "channels" at which holes may be punched. The tape reader optically scans the cues at a fixed rate and generates data corresponding to the information stored in each cue. This data is transferred or loaded into a bank of channel registers in the programmer at the pulse repetition rate of the pulses generated by the tape reader clock. Certain pairs of cues, each comprising a "stop command cue" and a "preselected time delay cue", carry information for interrupting the tape reader for preselected intervals of time. More specifically, a stop command cue has only one hole punched in the eighth channel, the other seven channels being blank. The preselected time delay cue has holes punched in any of the eight channels, depending upon the particular time delay desired. Although the present invention is described with respect to an eight channel tape, it should be understood that other storage media having more or less than eight channels may be used without departing from the spirit or scope of the invention.

Figure 1B:
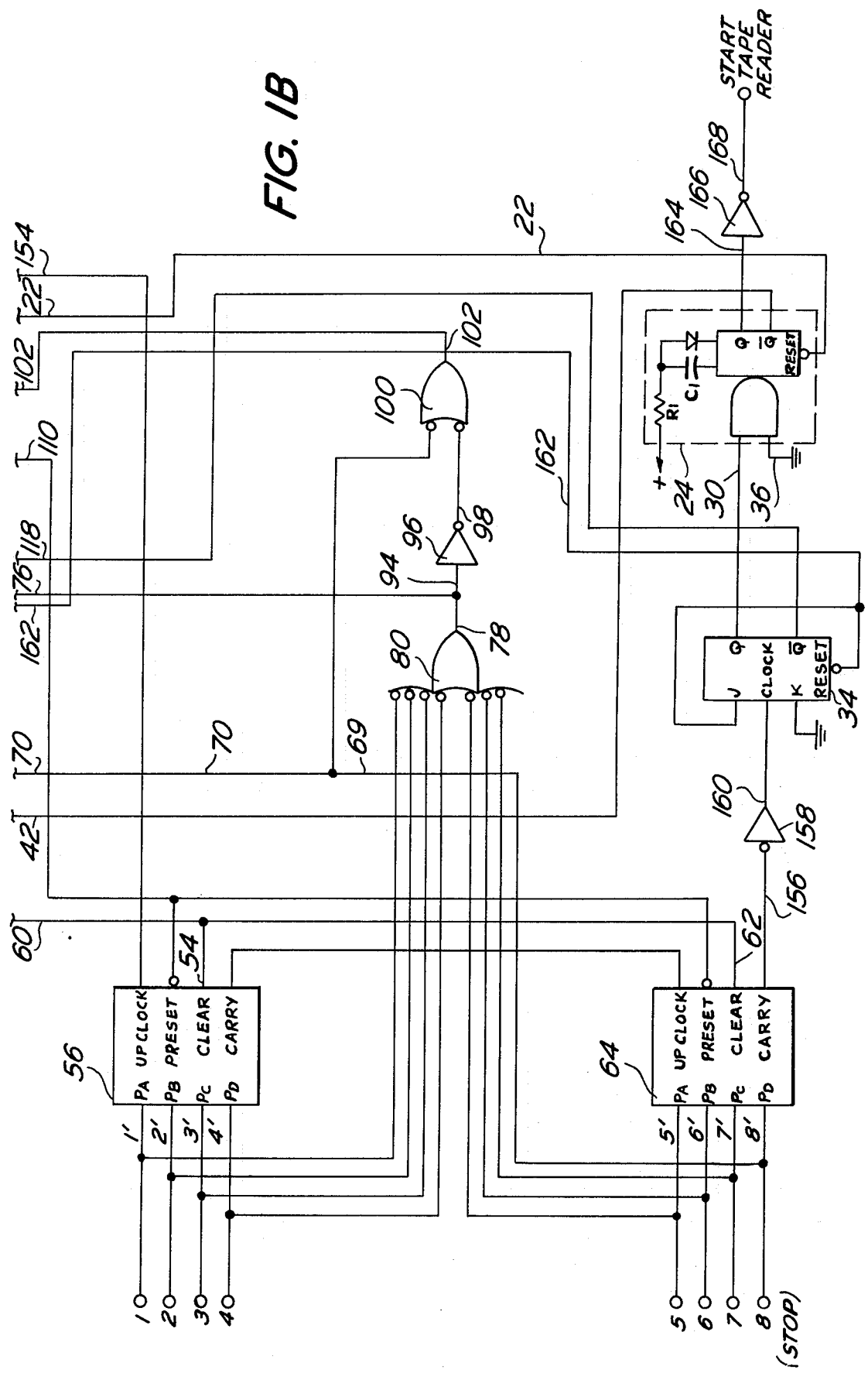

The channel register outputs in the programmer indicate those channels on a cue in which holes have been punched. The eight channel register outputs on the tape are represented by the numerals 1 through 8 in FIG. 1B. The channel register outputs corresponding to the first four channels on the tape, channel register outputs 1 through 4, are connected to the parallel data inputs 1' through 4' of counter 56. The channel register outputs corresponding to the last four channels on the tape, channels 5 through 8, are connected to the parallel data inputs 5' through 8' of counter 64. Counters 56 and 64 may be Texas Instruments 74193 up/down four-bit binary counters connected to count upwardly.

When the tape reader detects a stop command cue, that is, a cue having a hole punched only in its eighth channel, the present invention interrupts the tape reader. The precise length of the interval of time during which the tape reader remains interrupted is determined by the preselected time delay cue. The preselected time delay cue immediately follows the stop command cue.

When the tape reader encounters a stop command cue, channel register output 8 will be low and channel register outputs 1–7 will be high. Channel register output 8 is connected by a line 69 to an input 70 of NOR gate 72. Another input to NOR gate 72, input 76, is connected to the output 78 of a NAND gate 80. The output 74 of NOR gate 72 will be high only when both inputs 70 and 76 are low. The inputs to NAND gate 80 are the first seven channel register outputs 1–7. The output 78 of NAND gate 80 will be low only if each of the channel register outputs 1–7 are high. That is, NAND gate output 78 will be low only when the first seven channels on a cue have not been punched. Therefore, the NOR gate output 74 will go high only if a hole has been punched in the eighth channel of a cue while no holes have been punched in the first seven channels of the cue. In other words, NOR gate output 74 will go high only when the tape reader encounters a stop command cue.

The NOR gate output 74 is connected to the tape reader, and when NOR gate output 74 goes high it causes the tape reader to advance to the next cue, the preselected time delay cue, and stop. The channel register outputs change when the tape reader advances to the preselected time delay cue according to the particular combination of holes punched in that cue.

More specifically, when the tape reader reads the stop command cue, the tape reader clock loads the tape reader data into the channel registers in the programmer. Channel register output 8 will be low while channel register outputs 1–7 will be high. NOR gate 72 detects the presence of a stop command, and generates a high level at its input 74. When the tape reader clock loads the tape reader data into the channel registers, it also triggers one-shot 20. When triggered, one-shot 20 generates a high pulse at its Q output. The high pulse generated by one-shot 20 is transmitted by AND gate 84 to the clock inputs of flip-flops 50 and 68 respectively. Flip-flops 50 and 68 may be Texas Instruments 74107 J-K flip-flops with separate clock and reset inputs. The trailing edge of the high pulse generated by one-shot 20 clocks flip flop 50, causing the Q output of flip-flop 50 to go high.

As mentioned previously, when NOR gate output 74 goes high it causes the tape reader to advance to the next cue following the stop command cue, the preselected time delay cue. The tape reader reads the preselected time delay cue and the tape reader clock loads the tape reader data into the channel registers and triggers one-shot 20. Assuming that the first seven channels of the next cue are not all blank, the output 78 of NAND gate 80 will go high, causing the output 74 of NOR gate 72 to go low. NOR gate output 74 is connected to the J input of flip-flop 50. Therefore, when NOR gate output 74 goes low, so does the J input of flip-flop 50.

As already explained, when the tape reader clock loads the stop command data into the channel registers, it also triggers one-shot 20. One-shot 20 produces a high pulse in response. Before the trailing edge of the high pulse generated by one-shot 20 clocks flip-flop 50, the Q output of flip-flop 50 is low. The Q output of fip-flop 50 is connected to input 88 of AND gate 90. When input 88 is low, the output 92 of AND gate 90 is also low. AND gate output 92 is connected to the J input of flip-flop 68. Therefore, when AND gate output 92 is low so is the J input of flip-flop 68. When the trailing edge of the high pulse generated by one-shot 20 clocks flip-flop 50, the Q output of flip-flop 50 goes from low to high but the Q output of flip-flop 68 remains low because its J input is low. Thus, when the tape reader clock loads the stop command cue data into the channel registers, the Q output of flip-flop 50 goes from low to high but the Q output of flip-flop 68 remains low.

After a stop command cue has been encountered by the tape reader, the tape reader advances to the preselected time delay cue, and the tape reader clock loads the tape reader data corresponding to the preselected time delay cue into the channel registers. Assuming that not all of the first seven channels are blank in the preselected time delay cue, at least one of the channel registers outputs 1–7 will be low and the NAND gate output 78 will go high. NAND gate output 78 is connected to the input 94 of an inverter 96. When inverter input 94 goes high, the inverter output 98 goes low. Inverter output 98 is connected to an input of NAND gate 100. Therefore, when inverter output 98 goes low the output 102 of NAND gate 100 goes high. NAND gate output 102 is connected to an input of AND gate 90. The other input of NAND gate 90, input 88, is connected to the Q output of flip-flop 50. The Q output of flip-flop 50 goes high when the stop command cue is first encountered, as previously explained. When the Q output of flip-flop 50 goes high so does the input 88 to AND gate 90. Therefore, when the tape reader clock loads the preselected time delay data into the channel registers, the digital signals on lines 88 and 102 will be high. When both lines 88 and 102 are high, the AND gate output 92 goes high. The AND gate output 92 is connected to the J input of flip-flop 68. Therefore, the J input of flip-flop 68 goes high at this time.

When the tape reader clock loads the tape reader data for the preselected time delay cue into the channel registers, the tape reader clock also triggers the one-shot 20. Following a fixed time delay, therefore, one-shot 20 clocks the clock inputs of flip-flops 50 and 68. At this time, however, the NOR gate output 74 will be low because the NAND gate output 78 is high. Therefore, when flip-flop 50 is clocked, its J input is low. Accordingly, the Q output of flip-flop 50 goes from high to low. At the same time, the J input of flip-flop 68 is high, and the Q output of flip-flop 68 goes from low to high.

As mentioned previously, when the channel register outputs are loaded with the preselected time delay data, NAND gate output 92 goes high. When the tape reader clock loads the preselected time delay data into the channel registers, it triggers one-shot 20 as well. One-shot 20, then, generates a high pulse at its Q output which is transmitted to AND gate output 86. AND gate output 86 is connected to input 108 of a NAND gate 106. AND gate output 92 is connected to input 104 of NAND gate 106. Therefore, when one-shot 20 causes a high pulse to appear on line 86, both NAND gate inputs 104 and 108 will be high, and the output 110 of NAND gate 106 will go low. NAND gate output 110 is connected to the preset inputs of counters 56 and 64, respectively. When the preset inputs of counters 56 and 64 are driven low by NAND gate output 110, the counters are preset. In particular, the counter 56 is preset to the counter inputs 1'–4' and counter 64 is preset to the counter inputs 5'–8'. As will be explained more fully hereinafter, the particular counts to which counters 56 and 64 are preset determine the time interval during which the tape reader will remain stopped.

When the tape reader reads the preselected time delay cue and the Q output of flip-flop 68 goes from low to high, pulse generator 112 clocks counter 56 upwardly from the preset count. More specifically, the Q output of flip-flop 68 is connected to an input 114 to NAND gate 116. When the Q output of flip-flop 68 goes high so does the NAND gate input 114. The other input to NAND gate 116, input 118, is connected to the $\overline{Q}$ output of flip-flop 34. When the Q output of flip-flop 68 goes high, the $\overline{Q}$ output of flip-flop 34 is high. Accordingly, at this time, both NAND gate inputs 114 and 118 are high and NAND gate output 120 is driven low. NAND gate output 120 is connected to an input 122 to NOR gate 124. The other input to NOR gate 124, input 126, is connected to a Master Clock which generates a series of digital pulses, called Master Clock Pulses, which appear at NOR gate input 126. When NOR gate input 122 is low, NOR gate 124 is enabled, that is, the Master Clock Pulses are transmitted, in inverted form, by NOR gate 124 and appear at NOR gate output 128. NOR gate output 128 is connected to the clock input of a counter 130. NOR gates 116 and 124 and counter 130 are elements of the pulse generator 112. In summary, then, when the Q output of flip-flop 68 goes from low to high, NAND gate 124 is enabled and the Master Clock Pulses clock counter 130.

Counter 130 may be a Texas Instruments 7493 four-bit binary counter having separate clock and reset inputs. The outputs of counter 130, identified as $Q_a$, $Q_b$, $Q_c$, and $Q_d$ according to nomenclature well-known in the art, are connected to a NAND gate 132. The output 134 of NAND gate 132 is connected to a NAND gate 136. The other input to NAND gate 136, input 137, is connected to the Q output of flip-flop 68. When the output 138 of NAND gate 136 is high it drives the reset input of counter 130 high, causing counter 130 to reset. As mentioned previously, the Q output of flip-flop 68 is driven high by the one-shot 20 when the tape reader clock loads the preselected time delay data into the channel registers. NAND gate output 134 goes low when each of the counter 130 outputs, $Q_a$, $Q_b$, $Q_c$, and $Q_d$, are driven high. When NAND gate output 134 goes low, it drives NAND gate output 138 high, resetting counter 130. In a preferred embodiment, each of the outputs of counter 130 will be high when the counter counts fifteen Master Clock Pulses. Therefore, when counter 130 counts fifteen Master Clock Pulses, NAND gate 136 resets the counter. At the same time, however, the output of the most significant bit in the counter, $Q_d$, transmits a high level to the clock input of a counter 140. That is, the most significant bit of counter 130 clocks counter 140. Counter 140, therefore, advances one count whenever counter 130 counts fifteen Master Clock Pulses.

In a preferred embodiment, counter 140 counts sixteen pulses at its clock input before the most significant bit of the counter, $Q_d'$, goes high. Therefore, in the preferred embodiment, the pulse generator 112 divides down the pulse repetition frequency of the Master Clock Pulses by a factor of 15 times 16 or 240. The Master Clock in the preferred embodiment has a pulse repetition frequency of 960 pulses per second so that the pulse repetition frequency of the pulses generated at the output of the most significant bit of counter 140, $Q_d'$, is 960 pulses per second divided by 240 or 4 pulses per second.

The $Q_d'$ output of counter 140 is connected to the input 142 to inverter 144. In addition, the $Q_d'$ output is connected to an input 146 to NOR gate 148. When the inverter input 142 goes high the output 150 of the inverter goes low. The inverter output 150 is connected to the channel registers in the programmer and, when the inverter output 150 goes low, it clears the channel registers. This, however, does not affect the operation of counters 56 and 64 since they have already been preset to the channel register outputs.

The NAND gate output 120 which drives the input 122 to NOR gate 124 is connected to the input 152 of NOR gate 148. As mentioned previously, when NAND gate output 120 is low it enables NOR gate 124. In addition, when NAND gate output 120 is low it enables NOR gate 148. When enabled, NOR gate 148 passes the pulses generated at the $Q_d'$ output of counter 140. In particular, the pulses generated at the $Q_d'$ output of counter 140 appear in inverted form at the output 154 of NOR gate 148. The NOR gate output 154 is connected to the up clock input of counter 56. The pulse repetition frequency of the pulses appearing at the NOR gate 154 is four pulses per second, as mentioned previously, so that the counter 56 counts upwardly at the rate of four counts per second.

Counter 56 counts upwardly from the preset count determined by the first four channel register outputs 1–4. Assuming that a hole was punched in the first channel of the preselected time delay cue, but channels 2–4 were not punched, the counter input 1' would be low while the counter inputs 2'–4' would be high. Channel register output 1 is connected to the least significant bit in counter 56 and, accordingly, after counting one pulse at its up clock input, the counter will reach the terminal count. The next clock pulse appearing at the up clock input of counter 56 resets the counter and causes counter 56 to generate a pulse at its carry output, according to principles well-known in the art. The carry pulse output of counters 56 clocks the up clock input of counter 64. Assuming that no holes were punched in channels 5–8 so that the counter 64 inputs 5'–8' are all high, counter 64 will have been preset to its terminal count. Therefore, when counter 56 generates a pulse at its carry output to clock the up clock input of counter 64, the carry output of counter 64 goes high and counter 64 is reset.

The carry output of counter 64 is connected to the input 156 of an inverter 158. The output 160 of inverter 158 is driven low when the carry output of counter 64 goes high. The inverter output 160 is connected to the clock input of flip-flop 34. Flip-flop 34 may be a Texas Instruments 74107 J-K flip-flop with separate clock and reset inputs. The K input of flip-flop 34 is permanently clamped to the low digital level. The J input of flip-flop 34 is connected to its reset input and, by line 162, to the Q output of flip-flop 68. As mentioned previously, the Q output of flip-flop 68 is high while the Master Clock Pulses clock counter 130. Therefore, the J input of flip-flop 34 is kept high by the Q output of flip-flop 68. When the inverter output 160 goes low, it clocks flip-flop 34, and the Q output of flip-flop 34 goes high. When the Q output of flip-flop 34 goes high, it triggers one-shot 24. When triggered, one-shot 24 generates a high pulse of predetermined duration at its Q output and a low pulse of equal duration of its $\overline{Q}$ output. The Q output of one-shot 24 is connected to the input 164 of an inverter 166. Accordingly, the inverted form of the high pulse generated at the Q output of one-shot 24 appears at the output 168 of inverter 166. The inverter output 168 is connected to the tape reader and, when it goes low, it causes the tape reader to proceed to the remaining cues on the tape.

Thus, assuming that the only channel punched in the preselected time delay cue was the first channel, the clock input of counter 56 is clocked by two pulses before the inverter output 168 goes low and drives the tape reader. As mentioned previously, the pulse repetition frequency of the pulses at the up clock input of counter 56 is four pulses per second so that the period between two pulses is 0.25 seconds. Consequently, where all the channel register outputs are high except for the first channel register output, the counters 56 and 64 will preset so that the tape reader will pause for at least 0.25 seconds before proceeding to the remaining cues on the tape. It should be appreciated, however, that by presetting the counters 56 and 64 to different counts, that is, by changing the channel register outputs corresponding to the preselected time delay cue, multiples of the 0.25 second delay may be achieved. For example, if all the channel register outputs are low, indicating that each of the eight channels in the preselected time delay cue has been punched, counters 56 and 64 will be preset to 0. As a result, counter 56 will count fifteen pulses at its up clock input before reaching the terminal count. The next clock pulse at the input of counter 56 will reset the counter and cause the carry output of counter 56 to clock the up clock input of counter 64. Since counter 64 was preset to 0, it must count fifteen pulses at its up clock input before reaching the terminal count. The sixteenth pulse on the up clock input to counter 64 causes the carry output of the counter to go high. Thus, when all the channel register outputs are low at the time that counters 56 and 64 are preset, 256 pulses must appear at the up clock input of counter 56 before the carry output of counter 64 goes high. In other words, the carry output of counter 64 will not go high until 255 interpulse periods have elapsed at the up clock input of counter 56. As mentioned previously, the pulse repetition frequency of the pulses generated at the up clock input of counter 56 is four pulses per second and, therefore, the carry output of counter 64 does not go high until 255 times 0.25 or 63.75 seconds have elapsed. Consequently, the inverter output 168 does not cause the tape reader to proceed to the remaining cues on the tape until at least 63.75 seconds have elapsed after the tape reader has stopped.

In the preceding description, two examples have been given to illustrate the programmable feature of the invention. If the least significant bit input to counter 56, input 1', is low while all other inputs to counter 56 and 64, inputs 2'–8', are high, a 0.25 second delay will be achieved. If all the inputs 1'–8' to counters 56 and 64 are low, a 63.75 second delay will be achieved. Other delays may be obtained by placing other combinations of the inputs to counters 56 and 64 low and high. In general, the delay obtained will be some multiple of the 0.25 second delay, hereinafter referred to as "the least significant bit delay", obtained when only the least significant bit input 1' is low. For example, if only the second least significant bit, bit 2', is low, a delay of $2^1$ times 0.25 or 0.50 seconds will be obtained; if only the third least significant bit is low, a delay of $2^2$ times 0.25 or 1.0 second will be obtained, and so forth. Table 1, below, lists the delays obtained for each of the input bits to counters 56 and 64 when only that bit is low. The delays listed in Table 1 may be combined to achieve delays which are integral multiples of 0.25 seconds by driving particular combinations of the bit inputs low. The maximum delay of 63.75 seconds is obtained when all bit inputs 1'–8' are low, as previously explained.

Table 1

| Bit Input | Delay in Seconds |
| --- | --- |
| 1' | 0.25 |
| 2' | 0.5 |
| 3' | 1.0 |
| 4' | 2.0 |
| 5' | 4.0 |

Table 1-continued

| Bit Input | Delay in Seconds |
| --- | --- |
| 6' | 8.0 |
| 7' | 16.0 |
| 8' | 32.0 |

When the one-shot 24 is triggered by flip-flop 34 to cause the tape reader to proceed to the remaining cues on the tape, the $\overline{Q}$ output of one-shot 24 generates a low pulse. The $\overline{Q}$ output of one-shot 24 is connected to the input 42 of AND gate 40. When the AND gate input 42 goes low the AND gate output 44 also goes low. The AND gate output 44 is connected to the reset inputs of flip-flops 50 and 68. Therefore, when the $\overline{Q}$ output of one-shot 24 goes low, it causes flip-flops 50 and 68 to be reset. The Q outputs of flip-flops 50 and 68, then, go low when one-shot 24 is triggered by flip-flop 34. When the Q output of flip-flop 50 goes low it drives the AND gate output 92 low, causing the J input of flip-flop 68 to go low. When the Q output of flip-flop 68 goes low it drives the input 137 to NAND gate 136 low, causing the output 138 of NAND gate 136 to go high. When the NAND gate output 138 is high it resets counter 130. In addition, when the Q output of flip-flop 68 goes low it causes the input 122 to NOR gate 124 to go high, thereby disabling NOR gate 124 and preventing the Master Clock Pulses from passing through NOR gate 124 to the clock input of counter 130. Moreover, when the Q output of flip-flop 68 goes low it drives line 162 low, causing flip-flop 34 to be reset and the J input of flip-flop 34 to go low. Additionally, when the Q output of flip-flop 68 goes low, the $\overline{Q}$ output of flip-flop 68 goes high. The $\overline{Q}$ output of flip-flop 68 is connected to the reset input of counter 140. Therefore, when the $\overline{Q}$ output of flip-flop 68 goes high it resets counter 140. As mentioned previously, when the $\overline{Q}$ output of one-shot 24 is a low pulse, it causes the AND gate output 44 to go low. The AND gate output 44 is inverted by inverter 52 so that a high pulse appears on inverter output 60. Inverter output 60 is connected to the clear inputs of counters 56 and 64. Therefore, when the inverter output 60 goes high it clears counters 56 and 64. Thus, when the $\overline{Q}$ output of one-shot 24 goes low it causes counters 56 and 64 to be cleared. In summary, then, when the $\overline{Q}$ output of one-shot 24 goes low it starts the tape reader, resets flip-flops 50, 68 and 34, and clears counters 130, 140, 56 and 64.

When the $\overline{Q}$ output of one-shot 24 goes low, the tape reader resumes its scan of the tape. Thus, the tape reader proceeds through the remaining cues on the tape while each of the flip-flops and the counters in FIGS. 1A and 1B has been reset. Thereafter, the foregoing operations are automatically repeated whenever a stop command cue is encountered.

Although an embodiment of the present invention has been described herein with respect to specific forms of digital logic elements and digital signal levels, it should be understood that these elements may be modified and other elements may be substituted therefor without departing from the spirit or scope of the invention. For example, although certain flip-flops have been described as J-K flip-flops, other types of flip-flops, such as D-flip-flops may also be used with appropriate modifications to the circuitry. In addition, although certain counters 130 and 140 have been described herein as four bit counters, other counters having more or less bits may also be used depending on the desired pulse repetition frequency for the pulses at the up clock input of counter 56. Similarly, counters 56 and 64, having parallel data inputs connected to the channel register outputs, need not be four bit counters if a tape is used which has more or less than eight channels. Furthermore, although an embodiment of the present invention has been described as applied to a tape reader and programmer for controlling audio-visual equipment, it should be understood that the present invention will provide a programmable delay for interrupting a device other than a tape reader provided that appropriate timing signals are supplied to the trigger input 26 of one-shot 20. Moreover, other storage media than a tape may also be used in conjunction with counters 56 and 64 in the present invention, provided that the information stored in the storage media includes a first portion analogous to the stop command cue information and a second portion analogous to the preselected time delay cue information.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for interrupting a device for a preselected interval of time in response to information in a storage medium, comprising:
    means for generating a first digital signal in response to a first portion of said stored information for interrupting said device;
    means for generating a second digital signal in response to said first digital signal and a second portion of said stored information;
    means for generating a series of clock pulses having a predetermined pulse repetition frequency in response to said second digital signal;
    means for digitally counting a preselected number of said clock pulses, said preselected number being determined by said second portion of stored information; and
    means for generating a third digital signal for starting said device in response to said counting means, whereby said device is interrupted for a preselected time period determined by the pulse repetition frequency of said clock pulses.

2. Apparatus according to claim 1 including means for resetting each of said generating means and said counting means in response to said third digital signal.

3. Apparatus according to claim 1 including means for presetting said counting means in response to said second portion of stored information and both of said means for generating said first and second digital signals.

4. Apparatus for interrupting a tape reader for a preselected interval of time in response to information stored on a tape, comprising:
    means for generating a first digital signal in response to a first portion of said stored information for interrupting said tape reader;
    means for generating a second digital signal in response to said first digital signal and a second portion of said stored information;
    means for generating a series of counter clock pulses having a predetermined pulse repetition frequency in response to said second digital signal;
    means for digitally counting a preselected number of said counter clock pulses, said preselected number being determined by said second portion of stored information; and
    means for generating a third digital signal for starting said tape reader in response to said counting means, whereby said tape reader is interrupted for a preselected time period determined by the pulse repetition frequency of said clock pulses.

5. Apparatus according to claim 4 including means for resetting each of said generating means and said counting means in response to said third digital signal.

6. Apparatus according to claim 4 including means for presetting said counting means in response to said second portion of stored information and both of said means for generating said first and second digital signals.

7. Apparatus according to claim 4 wherein said means for generating said first digital signal includes means for detecting said first portion of said stored information; and said means for generating said second digital signal includes a first flip-flop connected to said first portion detecting means, means for detecting said second portion of said stored information, a gate connected to said first flip-flop and said second portion detecting means, and a second flip-flop connected to said gate, whereby said second flip-flop generates said second digital signal in response to said first portion and said second portion detecting means.

8. Apparatus according to claim 7 wherein said gate is an AND gate, said first and second flip-flops are J-K flip-flops, said first portion detecting means is connected to the J-input of said first flip-flop and said AND gate is connected to the J-input of said second flip-flop.

9. Apparatus according to claim 8 including means for presetting said counting means in response to said second portion of stored information and both of said means for generating said first and second digital signals, wherein said counting means includes a first digital counter having a preset input and said means for presetting includes a gate connected to said AND gate and said first digital counter preset input.

10. Apparatus according to claim 9 wherein said means for generating a series of counter clock pulses includes a master clock for producing a series of master clock pulses, a gating circuit connected to said second flip-flop for selectively gating said master clock pulses and a second digital counter having a clock input, said second digital counter clock input being connected to said gating circuit, whereby said second digital counter generates said series of counter clock pulses in response to said master clock pulses.

11. A method for interrupting a device for a preselected interval of time in response to information stored in a storage medium, comprising the steps of:
    generating a first digital signal in response to a first portion of said stored information to interrupt said device;
    generating a second digital signal in response to said first digital signal and a second portion of said stored information;
    generating a series of clock pulses having a predetermined pulse repetition frequency in response to said second digital signal;
    digitally counting a preselected number of said clock pulses, said preselected number being determined by said second portion of stored information; and generating a third digital signal for starting said device in response to said counting means, whereby said device is interrupted for a preselected time period determined by the pulse repetition frequency of said clock pulses.

12. A method according to claim 11 including the step of preventing said first and second digital pulses and said series of clock pulses from being generated in response to said third digital signal.

13. A method according to claim 11 wherein said step of digitally counting includes digitally identifying a preset number based on said second portion of stored information and counting from said preset number in response to said clock pulses.

* * * * *